(12) United States Patent
Wood et al.

(10) Patent No.: US 10,374,214 B2
(45) Date of Patent: Aug. 6, 2019

(54) METHOD FOR THE PRODUCTION OF ELECTRODES AND ELECTRODES MADE USING SUCH A METHOD

(71) Applicant: ETH ZURICH, Zurich (CH)

(72) Inventors: Vanessa Wood, Zurich (CH); Martin Otto Johann Ebner, Zurich (CH)

(73) Assignee: ETH ZURICH, Zurich (CH)

( * ) Notice: Subject to any disclaimer, the term of this patent is extended or adjusted under 35 U.S.C. 154(b) by 516 days.

(21) Appl. No.: 14/785,163

(22) PCT Filed: Apr. 16, 2014

(86) PCT No.: PCT/EP2014/001021
§ 371 (c)(1),
(2) Date: Oct. 16, 2015

(87) PCT Pub. No.: WO2014/170024
PCT Pub. Date: Oct. 23, 2014

(65) Prior Publication Data
US 2016/0093872 A1 Mar. 31, 2016

(30) Foreign Application Priority Data

Apr. 16, 2013 (EP) .................... 13001974

(51) Int. Cl.
| | |
|---|---|
| *H01M 4/04* | (2006.01) |
| *H01M 4/139* | (2010.01) |
| *H01M 4/13* | (2010.01) |
| *H01M 4/86* | (2006.01) |
| *H01M 10/0525* | (2010.01) |
| *C25B 11/03* | (2006.01) |
| *H01G 9/00* | (2006.01) |
| *H01G 9/042* | (2006.01) |
| *H01G 9/055* | (2006.01) |
| *H01G 9/15* | (2006.01) |
| *H01M 4/02* | (2006.01) |

(52) U.S. Cl.
CPC ............ *H01M 4/04* (2013.01); *C25B 11/035* (2013.01); *H01G 9/0029* (2013.01); *H01G 9/042* (2013.01); *H01G 9/055* (2013.01); *H01G 9/15* (2013.01); *H01M 4/0404* (2013.01); *H01M 4/0409* (2013.01); *H01M 4/13* (2013.01); *H01M 4/139* (2013.01); *H01M 4/8605* (2013.01); *H01M 10/0525* (2013.01); *H01M 2004/021* (2013.01); *H01M 2220/20* (2013.01); *H01M 2220/30* (2013.01)

(58) Field of Classification Search
CPC ...... H01M 4/04; H01M 4/0404; H01M 4/139; H01G 9/0029
See application file for complete search history.

(56) References Cited

U.S. PATENT DOCUMENTS

| | | | |
|---|---|---|---|
| 7,326,497 | B2 | 2/2008 | Matsubara et al. |
| 7,459,235 | B2 | 12/2008 | Choi et al. |
| 7,976,984 | B2 | 7/2011 | Tokuoka et al. |
| 2004/0258991 | A1 | 12/2004 | Choi et al. |
| 2008/0248306 | A1 | 10/2008 | Spillmann et al. |
| 2011/0195310 | A1 | 8/2011 | Kawamoto et al. |
| 2012/0088148 | A1 | 4/2012 | Leddy et al. |
| 2012/0177842 | A1 | 7/2012 | Mikami et al. |

FOREIGN PATENT DOCUMENTS

| | | |
|---|---|---|
| WO | 2007/036060 A1 | 4/2007 |
| WO | 2011/120643 A2 | 10/2011 |

OTHER PUBLICATIONS

K. Halbach, "Design of Permanent Multipole Magnets With Oriented Rare Earth Cobalt Material", Nuclear Instruments and Methods, 1980, pp. 1-10, No. 169.
Dirk Kehrwald et al., "Local Tortuosity Inhomogeneities in a Lithum Battery Composite Electrode", Journal of the Electrochemical Society, 2011, pp. A1393-A1399, No. 158 (12).
International Search Report for PCT/EP2014/001021 dated Jun. 2, 2014 [PCT/ISA/210].

*Primary Examiner* — Ladan Mohaddes
(74) *Attorney, Agent, or Firm* — Sughrue Mion, PLLC

(57) ABSTRACT

A method for the manufacturing of electrodes with at least one porous surfacial layer comprising anisotropic electrochemically active particles. It also relates to electrodes made using such a method. The method comprises the following steps: (a) coupling of paramagnetic nanoparticles to said active particles for the generation of composites; (b) preparation of a slurry of said composites, including a solvent mixed with a binder able to release a volatile component; (c) application of said slurry to a substrate to form a film; (d) application of a magnetic field to the film and orienting said active particles leading to a substrate in which said active particles are arranged with their shortest axes aligned along a preferred axis parallel to said substrate; (e) during or after application of said magnetic field evaporation of said solvent with solidification of the binder and release of said volatile component under formation of said surfacial layer.

29 Claims, 6 Drawing Sheets

METHOD FOR THE PRODUCTION OF ELECTRODES AND ELECTRODES MADE USING SUCH A METHOD

CROSS REFERENCE TO RELATED APPLICATIONS

This application is a National Stage of International Application No. PCT/EP2014/001021 filed Apr. 16, 2014, claiming priority based on European Patent Application No. 13 001 974.8, filed Apr. 16, 2013, the contents of all of which are incorporated herein by reference in their entirety.

TECHNICAL FIELD

The present invention relates to the field of electrodes in particular for batteries, as well as to methods of manufacturing such electrodes and specific uses of such electrodes. In particular it relates to the provision of ordered electrodes for Lithium ion batteries with increased energy density and charge/discharge rate capability

PRIOR ART

Today, lithium ion battery manufacturers prefer spherical particles as the electrochemically active material in positive and negative electrodes because the use of non-spherical particles results in unfavorable electrode microstructure.

The problems associated with low electronic and ionic conductivities become performance limiting at high charge and discharge rates as they are required for electric and hybrid vehicle batteries. Cell manufacturers counteract these issues with the addition of large amounts of electrochemically inactive conduction agents, engineering of thin and low density electrodes, or by using spherical particles, all of which either reduce achievable energy densities or drive up manufacturing costs.

Electrodes comprising non-spherical particles are nevertheless of high importance to the field of lithium ion batteries. Graphite for example, one of the most widely used electrochemically active materials for the negative electrode (anode), is naturally non-spherical, because it consists of stacked two-dimensional graphene sheets and typically has a platelet like form with the graphene sheets oriented parallel to the long axes of the platelet. The electronic conductivity of graphite is about 1,000 and the ionic conductivity is about 1,000,000 times higher along the graphene sheets than in the direction perpendicular to the graphene sheets.

Electrode manufacturing consists essentially of spreading a viscous mixture (the slurry) of solid particles and additives in a processing fluid onto thin metal foils or grids (the current collector) followed by evaporation of the process fluid leading to a porous layer structure with a solid volume fraction smaller than 100%. In the final cell, the pores are filled with an electrolyte.

Under the influence of gravity, non-spherical micrometer-sized particles align horizontally (essentially parallel to the surface plane of the substrate) in the slurry after slurry deposition onto the substrate. So graphite platelets typically align parallel to the current collector during electrode fabrication.

Effective ion transport in the electrolyte requires short path lengths throughout the thickness of the electrode towards the substrate. For applications demanding high charge and discharge rates, high ion and electron mobility in the active material and the electrolyte are necessary in the direction perpendicular to the current collector. Thus, the typical horizontal alignment of graphite platelets is unfavorable for these transport processes.

The shortcomings of graphite are often simply accepted, however, because it is abundant, nontoxic and offers good energy density and lifetime for a lower cost than alternative materials.

In order to tackle the problems associated with uncontrollable electrode anisotropy, processes to align graphite particles perpendicular to the current collector during electrode manufacturing using the diamagnetic properties of graphite in conjunction with strong externally applied magnetic fields have been proposed. Specifically, U.S. Pat. No. 7,326,497 discloses a method to align graphite platelets during electrode fabrication based on the diamagnetic susceptibility anisotropy present in highly crystalline graphite. Although graphite has one of the highest diamagnetic susceptibilities of all known materials, diamagnetism is a weak effect and high magnetic fields exceeding 1 tesla are necessary for particle alignment. The high required magnetic fields and the requirement of strong diamagnetic materials with diamagnetic anisotropy severely limits the range of applications as flux densities in the order of multiple Teslas being necessary to manipulate particles in the 10 micrometer diameter range causes severe engineering problems and adds to equipment costs. Expensive single-crystalline graphite has to be used to preserve the diamagnetic anisotropy of bulk graphite, and because only weak forces can be exerted onto individual particles, low viscosity slurries have to be prepared in order to allow quick particle reorientation.

Also, particle shape control has to be rather high, as discussed U.S. Pat. No. 7,976,984, describing a method to spheroidize highly crystalline graphite particles to reduce the viscosity of prepared slurries to counteract the problems associated with the process of U.S. Pat. No. 7,326,497, but this is further adding to fabrication costs.

This technology is inherently limited to graphite, because there are few electrochemically active materials known that provide the necessary diamagnetic anisotropy. U.S. Pat. No. 7,326,497 mentions only unidirectional fields, assumedly because of the apparent technical difficulties associated with alternatives. Because graphite particles are platelet-shaped, a magnetic field vector in one direction only constricts the particle orientation of the longest axis and leaves the particle free to rotate around the same. Because of a missing constriction in a second direction, neighboring particles do not align their flat faces and thus the achievable packing density of the electrode is lower than theoretically possible.

Lithium alloy materials such as group IV and V elements and composites suffer from high volume change >100% during alloying and de-alloying (lithiation/delithiation) that causes fracture in bulk materials and provide serious limitations to available binders. Using high aspect ratio particles with platelet shape and aligning them in a controlled way can provide means to manage volume change by allowing it to happen primarily in two directions, while absolute expansion and contraction in the third direction is limited and can therefore be accommodated by available binders.

This demonstrates a clear need for a process to control alignment of anisotropic particles.

SUMMARY OF THE INVENTION

It is therefore an object of the present invention to propose new methods for the manufacturing of electrodes and new electrodes, preferably obtained or obtainable using such methods.

Non-spherical conductive particles are proposed to be aligned during the fabrication process of porous lithium ion battery electrodes using paramagnetic nanoparticles and externally applied magnetic fields. The proposed method allows orientation of micrometer-sized particles in a way that reduces the tortuosity of the porous electrodes in the out-of-plane direction. Particles consisting of materials with anisotropic ionic and electronic transport properties, such as graphite, can be oriented in a way that aligns their high mobility directions, i.e. the graphene planes in graphite, with the predominant direction of ion and electron transport in a battery. The approach can be used to fabricate electrodes with higher energy density and charge and discharge rate capability than conventional techniques.

A simple and cost efficient technique is proposed to achieve the goal of densely packed electrodes consisting of non-spherical particles with their long axis aligned perpendicular to the current collector. The proposed method comprises the following steps:

paramagnetic nanometer-sized particles (nano-particles) are coupled to the surface of non-spherical, micrometer sized electrochemically active particles (active material/active particles), e.g. graphite;

then, the nano-particle decorated active material undergoes a slurry preparation process in a process fluid, which includes a binder (or the process fluid is the binder) and possibly additives (this is done preferably by mixing the decorated active material with e.g. additives like conduction agents and polymer binders, and by dispersion in a process fluid, or in the reverse order);

then, the slurry is applied as a thin film (typically the thickness is in the range of 1-1000 μm, preferably 20-50 μm) on a substrate, preferably a conductive substrate such as a metallic current collector mesh or collector foil, e.g. based on copper, silver, gold, aluminum, nickel, titanium, stainless steel, silver, gold, or alloys. Also possible are conductive polymer substrates. Preferably application takes place by means of pasting, doctor-blading, web-coating, rolling, screen printing, solution casting or spray deposition;

then, to the still non-solidified layer with the active material a magnetic field is applied, preferably a homogeneous, rotating magnetic field or a rotating magnetic field with controlled inhomogeneity is applied across the slurry-coated electrode, wherein in case of a rotating magnetic field the magnetic field vector preferably rotates in a plane perpendicular to the current collector, i.e. the substrate plane. The paramagnetic nano-particles experience strong interactions even with relatively weak externally applied magnetic field and transfer the resulting forces to the active particles. In the homogeneous magnetic field, the nano-particle decorated active particles that are suspended in the process fluid orient their long axis parallel to the direction of the magnetic field. This effect is explained by the nature of physical systems to aspire a state of lowest energy, in this case by particle rotation to minimize the energy stored in the magnetic as well as the gravitational field. When the magnetic field rotates fast enough such that fluid drag impedes the long particle axis to follow the field-rotation, the particles also orient their second-longest axis parallel to the plane in which the magnetic field rotates. In this configuration, the orientation of the active material particles is constricted in two dimensions, both parallel to the plane in which the magnetic vector rotates. This means that neighboring particles have their flat faces mutually aligned, thus allowing for higher particle packing densities;

after the alignment (or while the magnetic field is still present), the process fluid, a solvent fraction thereof or a volatile decomposition product thereof is evaporated by heating and/or pressure reduction and/or electromagnetic irradiation to "lock" all particles in their position and to form a porous essentially solid layer with accessible void volume, i.e. with a solid volume fraction below 100%. In the alternative or in addition to that this process can be a polymerisation step and it can be followed by an annealing step.

Generally speaking therefore the invention proposes a method for the manufacturing of electrodes with at least one porous surfacial layer (there can be one surface layer on one side only of a substrate or there can be such porous surface layers on both opposite sides of a substrate, or also the substrate can be removed after the making process and the electrode is then formed by a such a porous layer) comprising anisotropically shaped electrochemically active particles having a longest axis a which is at least 1.5 times longer than the shortest axis c, and having a ratio of the longest axis a to a second longest axis b which is smaller than 2. The method comprises at least the following steps:

(a) coupling of paramagnetic nanometer-sized particles to the surface of said anisotropically shaped electrochemically active particles for the generation of composites of nanometer-sized particles with anisotropically shaped electrochemically active particles;

(b) preparation of a slurry of said composites of nanometer-sized particles with anisotropically shaped electrochemically active particles, said slurry including a solvent mixed with a binder and/or or a liquid binder able to release a volatile or elutable component;

(c) application of said slurry to a planar substrate to form a film having a thickness in the range of 1-1000 micrometer (preferably a layer with a thickness 5-500 micrometer, more preferably of 10-50 micro-meter is applied);

(d) application of a magnetic field at least to the film and orienting said anisotropically shaped electrochemically active particles leading to a slurry-coated substrate in which said anisotropically shaped electrochemically active particles are arranged in that their shortest axes are, at least region-wise, essentially aligned along a common preferred axis oriented parallel to said substrate in said region;

(e) either during or after application of said magnetic field evaporation of said solvent with solidification of the binder and/or solidification of the binder and release of said volatile component and/or solidification of the binder and subsequent elution of the elutable component, under formation of said surfacial layer with a solid volume fraction below 100%.

One relevant feature of the electrode is a reduced out-of-plane tortuosity compared to traditionally fabricated electrodes. As a matter of fact, when using conventional making processes with anisotropically shaped electrochemically active particles, due to the rearrangement processes during the deposition of a surface layer the tortuosity in the out of plane direction is substantially larger than the one in the in plane directions. This is presumably, and without being bound to any theoretical explanation, due to the fact that the anisotropically shaped particles have the tendency to arrange and lie flat on the surface of the substrate leading to a more twisted pathway in a direction perpendicular to the surface of the substrate than in a direction in plane of the substrate. Using the proposed process the out of plane tortuosity can be specifically tailored such that it is not larger any more in the final porous surface layer than the in plane tortuosities. If the process is carried out ideally, it is even possible to create surface layers in which the out of plane tortuosity is smaller than the in plane tortuosity, it is for example possible to reach situations where the out of plane tortuosity is 20% or up to 50% smaller than the largest of the in plane tortuosities.

As pointed out above, according to a preferred embodiment in step (d) a (preferably homogeneous) rotating magnetic field is applied across the slurry-coated electrode, wherein in case of a rotating magnetic field the magnetic field vector preferably rotates in a plane perpendicular to the substrate plane.

The magnetic flux density B has to be high enough such that the minimum of the total energy $U_M+U_G$ occurs at inclination angle $\Theta=\pi/2$, i.e. for out-of-plane aligned particles. The magnetic ($U_M$) and gravitational ($U_G$) energies can be estimated for disc-shaped particles as:

$$U_G = V_p \cdot (\rho_p - \rho_f) \cdot g \cdot b \cdot \mathrm{Sin}(\Theta)$$

$$U_M = C_1 \cdot \left(\frac{B}{\mu_0}\right)^2 \cdot \mathrm{Sin}^2\left(\frac{\pi}{2} - \Theta\right)$$

$$C_1 = \frac{2\pi}{3} \cdot [(a+\Delta) \cdot (b+\Delta)^2 - a \cdot b^2] \cdot \frac{\mu_0 \cdot \chi_p^2}{\chi_p + 1}$$

with particle volume $V_p$, particle and fluid densities $\rho_p$ and $\rho_f$, gravitational acceleration g, particle thickness 2*a and disc diameter 2*b, nanoparticle coating thickness $\Delta$ and effective coating magnetic susceptibility $\chi_p$. For a more detailed derivation of these formulae reference is made to the documentation in the article by Randall M. Erb et al. in Science 335, 199 (2012), in particular to the supporting online material thereof. This documentation is expressly included into this disclosure as concerns these calculations and the corresponding basic parameters.

Typical values for sufficient flux densities are B>60 mT for disc-shaped particles with radius b=5 μm, aspect ratio b/a=2, nanoparticle diameter $\Delta$=7 nm and 8% nanoparticle surface coverage.

Preferably a magnetic field with a flux density in the range of 1-2000 mT, preferably in the range of 10-1000 mT, more preferably in the range of 100-500 mT is applied.

According to a preferred embodiment, in case of a rotating magnetic field the rotation frequency is in the range of 0.1-1000 Hz, preferably in the range of 1-100 Hz, more preferably in the range of 1-10 Hz.

In step (a) the paramagnetic nanometer-sized particles can be attached to the surface of the anisotropically shaped electrochemically active particles e.g. by using electrostatic adhesion or Van-der-Waals forces in a solvent or by in-situ generation of the nanometer-sized particles and attachment to the anisotropically shaped electrochemically active particles in a gas phase.

The anisotropically shaped electrochemically active particle preferably have a ratio of the longest axis a to the smallest axis c which is >2, preferably larger than 2.5, most preferably larger than 5 and/or have a ratio of the longest axis a to the second longest axis b which is <1.4, preferably smaller than 1.25, and/or wherein the largest axis a on average is in the range of 1-100 micro-meters, preferably in the range of 1-40 micro-meters, and/or wherein the smallest axis c on average is in the range of 0.1-50 micro-meters, preferably in the range of 1-10 micro-meters, and/or wherein the anisotropically shaped electrochemically active particle are selected from the group consisting of: intercalation compounds such as graphite, transition metal oxides, phosphates, conversion (displacement) reaction materials, Lithium alloys, or combinations thereof.

Said slurry may further comprise additives, in particular processing aids, conductivity agents, dispersion agents, and combinations thereof and/or wherein the binder used is a polymeric binder, preferably selected from the group consisting of: styrene butadiene rubber; nitrile butadiene rubber; methyl(meth)acrylate butadiene rubber; chloroprene rubber; carboxy modified styrene butadiene rubber; modified polyorganosiloxane polymer; polyvinylidene Fluoride (PVDF) as well as derivatives and combinations thereof and wherein the solvent is an organic solvent and/or water, wherein the organic solvent is preferably selected from the group consisting of: N methyl pyrrolidone (NMP), ethanol, acetone, water or derivatives or mixtures thereof.

Said substrate is preferably electrically conducting, preferably in the form of a foil, grid, woven or non-woven and any of these can be based on carbon, electrically conductive polymer, copper, aluminum, titanium, nickel, silver, gold, stainless steel, or combinations and/or alloys thereof.

Application of the slurry to the substrate in step (c) can take place by means of pasting, doctor-blading, web-coating, rolling, screen printing, solution casting, or spray deposition.

Subsequent to step (e) the film can be subjected to a heat annealing treatment also possible is in the irradiation treatment for cross-linking of the matrix material.

Subsequent to step (e) the paramagnetic particles can be removed from the layer, details of this possibility are given further below.

The magnetic nanoparticles can be selected to be paramagnetic and/or superparamagnetic nanoparticles, preferably selected from the group of coated or uncoated, surfactant stabilised or surfactant unstabilised, electrostatically stabilised or electrostatically unstabilised particles preferably based on: iron oxide, such as $Fe_3O_4$, $Fe_2O_3$, cobalt, nickel, and derived alloy based particles, wherein preferably the nanoparticles have a size range of 1-500 nm in diameter, preferably in the range of 1-50 nm.

The surfactants used by commercial suppliers of ferrofluids being the source of the magnetic nanoparticles paramagnetic and/or superparamagnetic nanoparticles) are usually kept secret and are likely electrochemically unstable at the low operating potentials of graphite and can decompose on the graphite surface. In addition to unfavorable capacity loss, decomposition of organic molecules on the surface of graphite can interfere with formation of a stable solid-electrolyte interlayer (SEI) and thus should preferably be prevented. Since commercial colloidal nanoparticles are synthesized and stored in suspensions with large surplus of surfactants, the amount of surfactants ending up on the graphite particles can be reduced by washing the nanoparticles before deposition. This can be achieved by diluting the ferrofluid with a solvent ($H_2O$, organic solvents such as alcohols, etc.) and separation of nanoparticles from solvent, e.g. by means of nanoparticle concentration in a magnetic field or by centrifugation. Removal of surfactants by solvents, acids, UV-Ozone irradiation, or mild heat treatment are other viable alternatives.

In the context of the potentially problematic surfactants there exist three different approaches: (1) synthesizing super-paramagnetic nanoparticles without surfactants (described in Example 3), (2) synthesizing super-paramagnetic nanoparticles with removable surfactants (described inter alia in Example 2), and (3) synthesizing super-paramagnetic nanoparticles with permanent surfactants that are electrochemically stable and do not interfere with electrochemical operation of the battery.

The above-mentioned "removable surfactants", which according to yet another preferred embodiment are used for coating of the nanoparticles, are those which either decompose and then evaporate from the structure during processing and/or during use, or are those which directly evaporate from the structure during processing and/or during use. Possible examples of the former systems are quarternary ammonium salts, e.g. quarternary alkyl ammonium salts such as those based on the tetramethylammonium (TMA) cation. The counter-irons can e.g. be hydroxides and/or halogenides. Possible examples are given in the following list: hydroxides: tetraethylammonium hydroxide (TEAH); tetramethylammonium hydroxide (TMAH or TMAOH); tetrabutylammoniumhydroxid (TBAH); tetra-n-butylammonium hydroxide or chlorides such as: tetraethylammonium chloride (TEAC); tetramethylammonium chloride; tetrabutylammonium chloride and mixtures thereof.

Without being bound to any theoretical explanation, the function/behaviour of a removable surfactant such as TMAH appears to be the following:

Above pH 7, the surface of super-paramagnetic nanoparticles is surrounded by $OH^-$ groups and the super-paramagnetic nanoparticles are, in case of tetramethylammonium, surrounded by tetramethylammonium cations. The positively charged tetramethylammonium cation shell hinders agglomeration of the super-paramagnetic nanoparticles. After deposition of the super-paramagnetic nanoparticles on graphite particles, the TMAH residues evaporate as ammonia at temperatures above 60° C. and pressures below 100 mbar.

Furthermore the present invention relates to an electrode with at least one porous surficial layer obtained or obtainable by using a method according to a method as outlined above or an electric and/or electronic device. Such a device can e.g. be an electrolytic device, an energy storage and/or delivery device, an analytical device, a chemical synthesis device, or combinations thereof, in particular it can be a battery, a fuel cell, a capacitor, a device for electrochemical water splitting, a device for electroplating, in each case comprising at least one such electrode. It is also possible that the electrode essentially consists of such a porous layer, e.g. if after the making process as outlined above the substrate is removed such that only the porous layer remains.

Furthermore the present invention relates to an electrode with at least one porous surficial layer and/or electric or electronic device, preferably battery comprising at least one such electrode, wherein said porous surficial layer comprises anisotropically shaped electrochemically active particles having a longest axis which is at least 1.5 times longer than the shortest axis, and having a ratio of the longest axis to a second longest axis which is smaller than 1.5, wherein the anisotropically shaped electrochemically active particles are embedded and held together by a binder and are arranged in said layer in that their shortest axes are, at least regionwise, essentially aligned along a common preferred axis oriented parallel to said substrate in said region, and wherein said surficial layer has a thickness in the range of 1-1000 micro-meter, preferably in the range of 20-50 micro-meter and has a solid volume fraction below 100%, preferably in the range of 20-90%, more preferably in the range of 50-80%. In other words the porosity defined as the void volume is larger than zero, preferably at least in the range of 10-80%, more preferably in the range of 20-50%.

Such an electrode and/or electric or electronic device can be characterised in that the surfacial layer has a tortuosity in the range of 1-10, preferably in the range of 1-3.

Such an electrode and/or electric or electronic device may have a surface layer with a thickness in the range of 10-1000 micro-meter, preferably in the range of 20-500 micro-meter.

To summarize, a method to tailor the microstructure of porous electrodes for lithium ion batteries manufactured from non-spherical particles is thus presented. The method allows reducing the tortuosity of porous electrodes in specific spatial directions, namely the out-of-plane direction, thus increasing effective ion transport in the electrolyte phase by reducing the resistance associated with long and wound conduction paths. The beneficial ionic transport can be leveraged to fabricate thicker than conventional electrodes but with comparable rate-performance, or to fabricate electrodes with the same thickness but increased rate-performance. Also, methods to produce the specific temporal and spatial magnetic field patterns necessary for this process are presented. In addition to increase ionic transport, the method can be used to fabricate electrodes from non-spherical particles of materials featuring high volume expansion during lithiation/delithiation in a way the electrodes can accommodate the volume change.

The surface of micrometer-sized, magnetically inactive, electrochemically active and shape-anisotropic particles is decorated with nanometer-sized super-paramagnetic particles to make the micrometer-sized particles responsive to externally applied magnetic fields. The micrometer-scale particles are preferably platelet-shaped, i.e. they possess two axes of comparable length and one significantly smaller axis. The largest dimension is more than 1.5, preferably more than 2 times bigger than the smallest dimension, whereas the largest dimension is not more than 2 times bigger than the second largest dimension. A mixture of nanoparticle decorated micrometer-scale platelets, a process fluid and a polymeric binder and optional additives such as dispersion and conduction agents is spread as a thin film (e.g. 10-500 μm) onto a metal foil or mesh.

Applying a homogeneous, static magnetic field of sufficient strength creates a momentum of torque that forces the platelets to align their longest axis with the direction of the magnetic field, as depicted schematically in FIG. 1a.

Applying a homogeneous, rotating magnetic field with sufficiently high rotation frequency creates moments of torque that force the platelets to align their longest and second longest axis parallel to the plane in which the magnetic field rotates, as schematically depicted in FIG. 1b.

Applying an inhomogeneous magnetic field, i.e. a field gradient, additional forces will act on the particles pushing them towards regions of higher flux density.

Evaporating the process solvent while or after applying the magnetic field conserves the particle orientation, establishes bonding bridges of the binder material between the particles to form a solid structure, and results in a porous electrode with controlled, anisotropic tortuosity.

In the prior art, electrodes are fabricated from the same micrometer-sized materials without super-paramagnetic nanoparticle decoration and application of a magnetic field, platelet shaped particles align their longest and second longest axes horizontally driven by gravity. The resulting porous electrodes feature anisotropic tortuosity with lower in plane tortuosity values and higher values of out of plane tortuosity.

Controlling the particle alignment during electrode fabrication allows reducing the at of claim tortuosity, i.e. in the direction normal to the current collector, thus reducing the path length through the volume not occupied by micrometer-sized particles, binder, or solid additives, from a point inside the electrode near the current collector through the thickness of the electrode to the other side of the electrode, as indicated by the dotted paths in FIGS. 1c and d.

The resulting configuration is ideal for battery electrodes, because it arranges the active particles in a densely packed way, with their electronic and ionic high-mobility directions aligned to the direction of charge transport required in a battery. After the electrodes are dried, processing is continued as for traditional electrodes.

The process only requires the active material particles to be anisotropic in shape and to preferably have a mean particle size in the range of micrometers. The required magnetic flux density as well as the required field rotation frequency can be calculated and optimized once a specific material is selected, as is outlined in more detail above.

These are relatively general requirements that can be met by a range of active materials other than graphite.

Also, various magnetic nano-particles can be used, as long as their magnetic susceptibility is high enough such that achievable magnetic fields suffice to exert the required forces.

Possible particles are e.g. given by particle is based on $Fe_3O_4$, $Fe_2O_3$, nickel, cobalt, alloys as well as mixtures thereof. The diameter of such particles is typically in the range of 1-500 nm, preferably 1-50 nm.

To generate the required homogeneous, inhomogeneous, static or rotating magnetic fields, electromagnets and/or permanent magnets can be used. Using multiple current loops in a Helmholtz configuration, the maximum magnetic flux density can be limited by the number of loops and the current that can be fed through them, but high rotation frequencies can be generated. Alternatively, permanent magnets (e.g. NdFeB-based) can be used in a configuration known as a Halbach cylinder (for the details of such an arrangement reference is made to K. Halbach, Nuclear Instruments and Methods 169 (1980) 1-10, the content of which is included into this specification). In this arrangement, a homogeneous magnetic field develops in a direction perpendicular to the axis of the cylinder, in contrast to traditional cylindrical magnets (coaxial field). Rotation of the magnetic field experienced by the particles on the current collector can be achieved in two ways: Simply by mechanically rotating the cylinder around the current collector placed in the cylinder's symmetry axis, or by translating the current collector through a line of coaxial Halbach cylinders, which have their direction of magnetic field mutually rotated in a way, that an object translating along their axis experiences a rotating effective magnetic field.

For battery applications, it is important that all constituents of the electrode are electrochemically stable during battery operation. Care has to be taken to avoid traces of transition metals (such as iron) in their metallic state on the graphite surface. Metallic iron is known to increase interfacial resistance by catalysing solid-electrolyte-interface-layer (SEI) growth. Magnetite ($Fe_3O_4$), on the other hand, is electrochemically compatible with graphite, and can in fact be electrochemically active itself. Deposition of nano-particles on the active material can be performed with a variety of processes. E.g. it can be carried out in a process fluid such as water with a pH value precisely controlled such that active material and nano-particles develop surface charges of opposite polarity and attract each other. Other routes such as thermal or plasma enhanced gas phase deposition (e.g. utilizing a process as described in US 2008/0248306) would is possible too. If residual nano-particles are not desired on the surface of the active material, they can be removed after electrode fabrication by means of wet, vapour or gaseous etching. Alternatively, if contact between nano-particles and the electrolyte is to be avoided, the active material can be coated with a thin coating (e.g. amorphous carbon) after nano particle deposition.

As concerns the deposition of paramagnetic nanoparticles on the surface of the non-spherical micrometer-sized particles and the use of relatively weak, homogeneous, static or magnetic fields to control the alignment of the micrometer-sized particles this is preferably possible by using electrostatic attachment techniques. Reference is e.g. made to WO 2011/120643 which comes from the unrelated field of anisotropically reinforced non-porous materials, where the micrometer sized particles are not electrochemically active. The disclosure of this document is specifically included into this specification as concerns the attachment of nano-particles to the surface of non-spherical micrometer-sized particles. The magnetic and/or superparamagnetic nano-particles can be attached to the non-spherical reinforcing particles by electrostatic attachment. This is possible according to a preferred embodiment by immersing the magnetic and/or superparamagnetic nano-particles and the non-spherical particles in a fluid, preferably in water, under conditions such that the non-spherical particles and the magnetic and/or superparamagnetic nano-particles have opposite charge, wherein the charges are strong enough such that the energy of electrostatic attraction is larger than thermal energy when the particles are close to each other, typically tens of nanometers apart. Preferably, if the fluid is water, the opposite charge is generated by adapting the pH of the solution to a value above the isoelectric point of one element and below the isoelectric point of the other element (an element being the magnetic and/or superparamagnetic particle or the non-spherical particle, respectively). Alternatively, adding a salt such as NaCl up to a concentration of about 0.3M to screen the electric double layer surrounding submerged active particles and nanoparticles can be utilized to initialize the deposition process.

According to yet another preferred embodiment, the non-spherical reinforcing particles are coated with a material allowing for the generation of charged non-spherical particles if immersed in water.

Furthermore the magnetic and/or superparamagnetic nanoparticles can be coated with a material allowing for the generation of charged magnetic and/or superparamagnetic nanoparticles if immersed in water.

The micrometer sized particles can also be coated on the surface with magnetic and/or superparamagnetic nano-particles utilizing a downer plasma reactor (see e.g. WO 2007/036060) and organometallic precursors such as iron-penta-carbonyl $Fe(CO)_5$ or iron-tert-butoxide $[Fe(OtBu)_3]_2$ in a reduced pressure argon atmosphere optionally containing controlled amounts of oxygen or carbon dioxide in an inductively coupled radio frequency plasma discharge.

As concerns the electrochemically active material, this preferably makes up 20-90 wt % of the porous surficial layer dry electrode layer. The electrochemically active material is given by anisotropically shaped electrochemically active particles, preferably in the form of platelets with two axes of comparable length and one axis significantly smaller (considering an mutually orthogonal axes system). The ratio of the longest to the smallest axis to the smallest axis is preferably >1.5, and/or the ratio of the longest axis to the second longest axis is preferably <2. The electrochemically active material can be intercalation compounds such as graphite, transition metal oxides, phosphates, conversion (displacement) reaction materials, Lithium alloys, or combinations thereof.

In case of transition metal oxides these can be selected from the group consisting of: $LiCoO_2$; $LiMn_xNi_yCo_{1-x-y}O_2$; $Li_3Ti_4O_{12}$, $TiO_2$; $LiMn_2O_2$; $LiVO_2$ as well as derivatives and related compounds and mixtures thereof.

In case of phosphates these can be selected to be LiFePO4 and related compounds.

In case of conversion (displacement) reaction materials these can be transition metal oxides such as MOx, with M=Fe, Co, Ni, Cu, Cr, Mo, etc.

In case of Lithium alloys these can be with Si, Ge, Sn, Pb, P, As, Sb, Bi, Al, Ga, In, Ag, Mg, Au, Zn, Cd and with combinations thereof.

Preferably the layer further contains a conduction agent, which can make up 0-40 wt % of the porous surfacial layer dry electrode layer. The conduction agent can be selected from the group consisting of: nanometer-scale carbon black; micrometer-scale graphite; carbon nanotubes; coke; carbon fibers; graphene, graphene oxide, as well as combinations and derivatives thereof.

The porous surfacial layer dry electrode layer is held together by a binder, preferably a polymeric binder. The binder preferably makes up 1-20 wt % of the porous surfacial layer dry electrode layer. Possible binder materials are e.g. those disclosed in U.S. Pat. No. 7,459,235, or also in US2004/0258991, which documents are both included as concerns the binder.

Possible binder systems are in particular selected from the group consisting of: styrene butadiene rubber; nitrile butadiene rubber; methyl(meth)acrylate butadiene rubber; chloroprene rubber; carboxy modified styrene butadiene rubber; modified polyorganosiloxane polymer; polyvinylidene Fluoride (PVDF) as well as derivatives and combinations thereof.

Furthermore the slurry may comprise dispersion agents, preferably making up 1-10 wt % of the liquid slurry. The dispersion agents can be selected from the group consisting of: carboxymethylcellulose (CMC); carboxyethylcellulose; aminoethylcellulose; oxyethylcellulose, and combinations thereof.

Further the slurry may comprise processing aids such as surfactants, anti-foam agents, stabilizers, antioxidants and/or it may comprise colorants, fibrous reinforcing materials, or also materials which make sure the layer keeps a certain softness or flexibility over time if this is desired as a property of the electrode etc. In relation with the surfactants used the above-mentioned issue of interference with stable solid-electrolyte interlayer (SEI) is preferably taken account of, and therefore according to a preferred embodiment as surfactants e.g. the above-mentioned "removable surfactants" are used.

Furthermore the slurry is based on a solvent, which preferably makes up 10-50 wt % of liquid slurry. The solvent is preferably selected from organic or inorganic solvents selected from the following group: N methyl pyrrolidone (NMP); ethanol, acetone; water or derivatives thereof or mixtures thereof.

The substrate carrying the porous surfacial layer dry electrode layer is preferably a current Collector, which can be based on copper, aluminum, titanium, nickel, gold, silver or alloys thereof. The substrate can take the form of a foil or mesh, woven or non-woven.

The nanoparticles are preferably super-paramagnetic and/or surfactant stabilized and/or electrostatically stabilized and they typically have sizes in the range of 1-500 nm, preferably in the range of 1-50 nm. In case of surfactant stabilized nanoparticles preferably the above-mentioned "removable surfactants" are used.

Subsequent to the step of evaporation of the solvent and/or subsequent to a subsequent annealing step the magnetic and/or superparamagnetic nano-particles can be selectively removed from the matrix. Indeed removal of the magnetic and/or superparamagnetic nano-particles can be desirable for reasons such as colour induced by the magnetic and/or superparamagnetic nano-particles, but also for chemical and/or physical reasons. Unexpectedly removal of the magnetic and/or superparamagnetic nano-particles out of the solidified matrix with the oriented particles embedded therein is possible without imparting or even destroying the orientation of the particles.

Removal of the magnetic and/or superparamagnetic nano-particles can for example be effected by treating the layer material with an acidic fluid, wherein preferably the acidic fluid has a pH-value below 3, preferably below 1, and wherein the treatment takes place at a temperature preferably 10-30° C. below the melting point of the matrix, more preferably below 30° C.

Preferentially, the treatment takes place for a timespan of less than 48 hours, preferably of less than 10 minutes.

Preferentially the acidic fluid removal of the magnetic and/or superparamagnetic nanoparticles is an aqueous solution of nitric acid, sulphuric acid or phosphoric acid, preferably with a pH in the range of 0-3.

The required rotating magnetic fields can be produced in multiple ways: by superposition of magnetic fields of perpendicular solenoids driven with sinusoidal currents with specific phase shift, rotating solenoids with a constant current applied, and permanent magnets. The latter approach is discussed in detail here:

Yoke Magnet:

Facing permanent magnets with magnetization in the same direction connected by a yoke as depicted in FIG. 2a create a homogeneous magnetic field in the space between them. A stationary object in the center of such an arrangement experiences a homogeneous, rotating magnetic field if the magnet/yoke arrangement is rotated around the object.

Halbach Cylinder:

Permanent magnets arranged in a configuration known as a Halbach cylinder with k=2 generate a homogeneous, magnetic field, oriented perpendicular to the cylinder axis without the need for a yoke. The magnetization of an ideal Halbach cylinder in the plane perpendicular to the cylinder axis is given by $\vec{M}(\phi)=M_r[\sin(k\phi)\vec{p}-\cos(k\phi)\vec{\phi}]$, where Mr is the ferromagnetic reminiscence and the geometry is as depicted in FIG. 2b. This arrangement creates homogeneous magnetic fields in the inside of the cylinder while the field on the outside vanishes. Rotating the cylinder around its symmetry axis creates a rotating homogeneous magnetic field relative to a stationary object inside the cylinder. Using a finite number of permanent magnets can approximate the required magnetization pattern, as depicted in FIGS. 2c and d.

Stationary Halbach Array:

Permanent magnets arranged in a planar configuration as depicted in FIG. 2e, known as a Halbach array following the magnetization pattern $\vec{M}(x)=M_r[\cos(kx)\vec{x}+\sin(kx)\vec{y}]$ generate a spatially rotating magnetic field in xz-planes with y>0 and vanishing magnetic field for y<0. The spatial wave number k describes the length-scale of the field rotation. In the y-direction, however, the magnetic field is not homogeneous, but decays exponentially, with the magnetic flux density following $\vec{B}(x,y)=B_0[\cos(kx)\vec{x}+\sin(kx)\vec{y}]e^{-ky}$.

Moving an object in a xz-plane with y>0 in x-direction at constant velocity relative to the magnet arrangement generates an effective rotating field experienced by the object. Alternatively, the object (or magnet arrangement) can be oscillated back and forth in x-direction to generate a magnetic field with an angular oscillating field vector. A magnetic field oscillating at sufficiently high frequencies is sufficient for the purpose of particle alignment. The field gradient caused by the exponential decay in y-direction, exerts a force on the nanoparticle decorated platelets pulling them towards the current collector. This results in electrode compaction, a welcome effect to achieve low electrode porosity without subsequent calendaring.

Rotating Halbach Array:

Permanent magnets arranged in the above mentioned planar Halbach array configuration, when rotated individually with equal angular velocity and direction (FIG. 2g) following the magnetization pattern $\vec{M}(x,t)=M_r[\cos(kx+\omega t)\vec{x}+\sin(kx+\omega t)\vec{y}]$ create a spatially and temporally rotating magnetic field, FIG. 2h. An object in a xz-plane with y>0 experiences a rotating field $\vec{B}_{x_0,y_0}(t)=B_0[\cos(kx_0+\omega t)\vec{x}+\sin(kx_0+\omega t)\vec{y}]e^{-ky_0}$ The value of 1/k is in the order of 1-100 mm. Consequently, the flux density of the resulting inhomogeneous field component decays to 1/e over a distance of 1/k.

Directional tortuosity can be calculated from three dimensional representations of the microstructure of porous media, obtainable by tomography techniques such as x-ray tomography or scanning electron microscopy coupled with focused ion beam milling. Once a three-dimensional digital representation is available, steady state diffusion in the pore phase can be numerically simulated on a computer and a tortuosity value can be derived. In short, the diffusion equation with insulating boundary conditions on the solid material boundaries and fixed concentration boundary conditions on two opposite faces (c(z=0)=0, c(z=D)=1) is solved for the steady state. Assuming a regular discretization with a cubic mesh, the tortuosity r is then calculated using the size of the numerical domain W×H×D, the cross-sectional pore area $A_{pore}$, the porosity ε of the electrode, and the simulated concentration c by:

$$\tau = \frac{W \cdot H \cdot \varepsilon}{D^2} \cdot \sum_{z_0=1}^{D} \left( A_{pore}(z_0) \cdot \left( \frac{\partial c}{\partial z} \bigg|_{z_0} \right) \right)^{-1}$$

Details are described for example in D. Kehrwald, P. Shearing, N. Brandon, P. Sinha, S. Harris, *Journal of the Electrochemical Society*, 158 (12) A1393-A1399 (2011), which for the purpose of an as concerns these calculations is expressly included into this disclosure. Further preferred embodiments are given in the dependent claims.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings, FIG. 1 schematically shows the influence of homogeneous magnetic fields on super-paramagnetic nanoparticle decorated platelets and porous electrodes fabricated from them; a static field (a) generates a moment of torque that drives platelets to align their longest axis with the direction of the field, whereas a rotating field (b) drives the platelet to align the two longest axes parallel to the plane in which the magnetic field rotates; during the fabrication of porous electrodes using the conventional approach (c), platelets align horizontally resulting in long and wound transport paths, as indicated by the dashed line; applying a rotating magnetic field during drying aligns functionalized platelets vertically (d) thus reducing the effective transport path length.

DESCRIPTION OF PREFERRED EMBODIMENTS

Example 1

Figure 1:
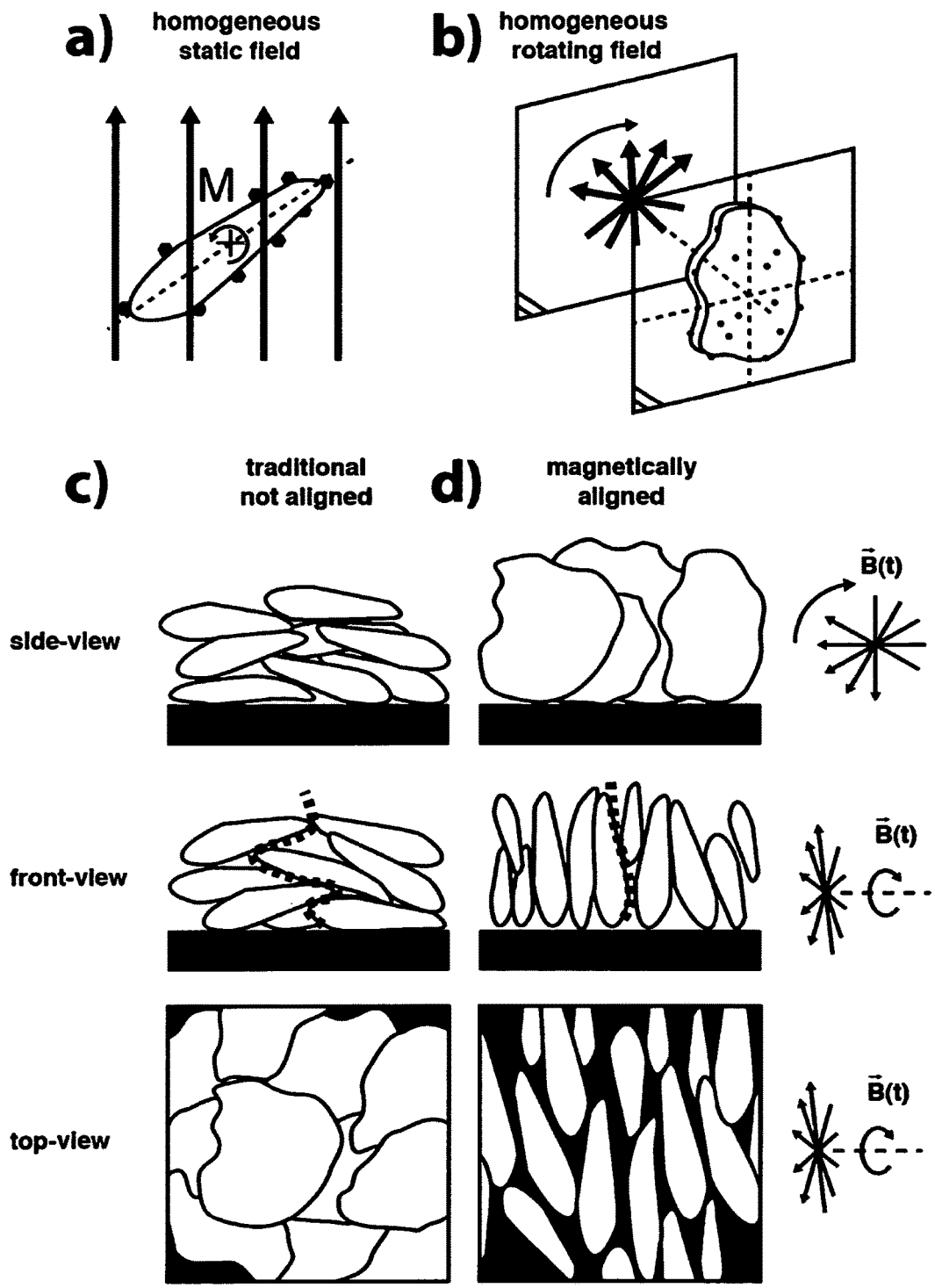
Figure 2:
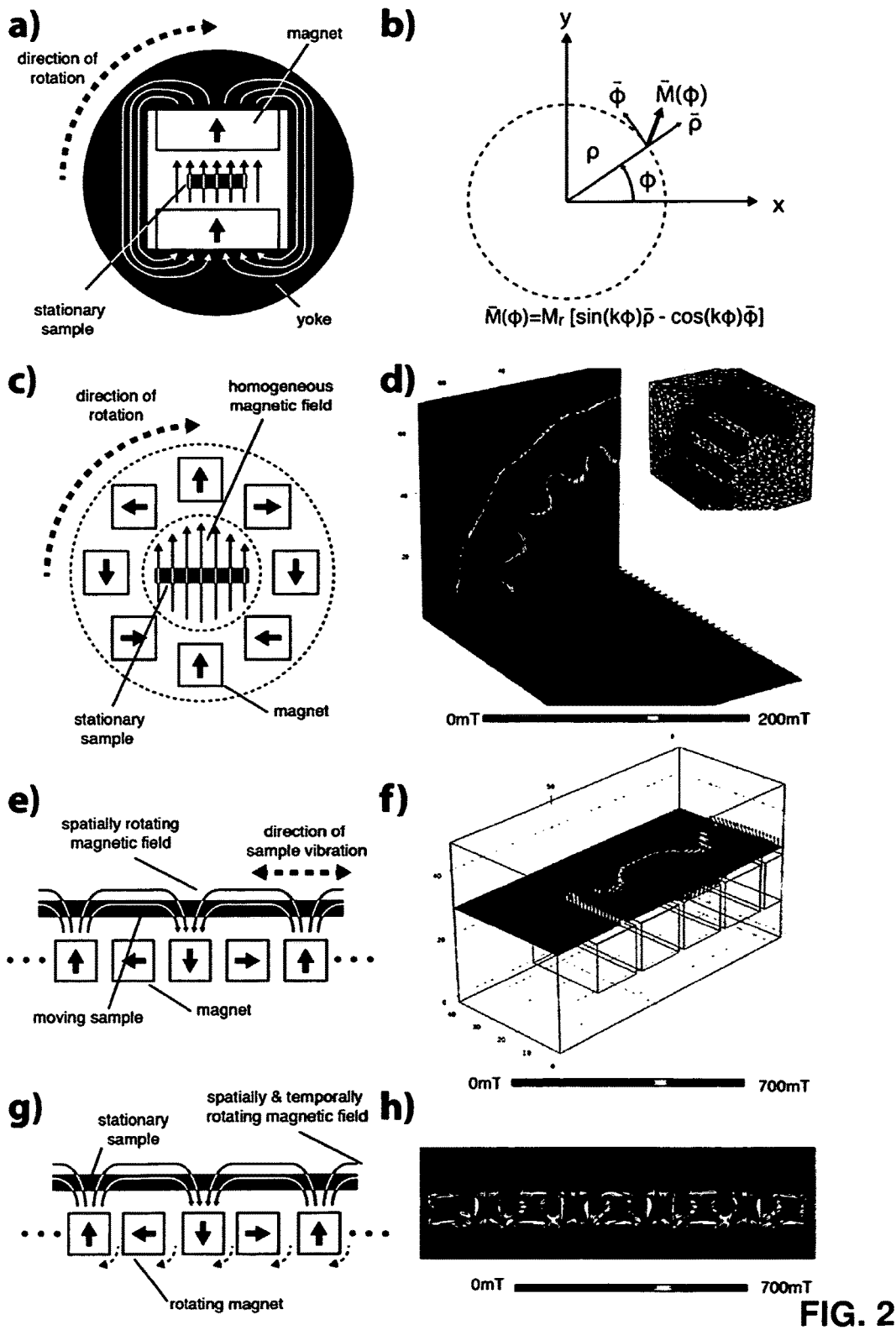
FIG. 2 shows means to generate rotating magnetic fields using permanent magnets, wherein (a) shows a sketch of facing permanent magnets in a yoke (a), (b) the geometry of magnetization pattern (c) a sketch of a cylindrical Halbach arrangement, featuring a homogeneous magnetic field perpendicular to the cylinder axis; (d) shows a finite element simulation of the magnetic flux density distribution inside the cylinder with an average of 100 mT; rotating the cylinder about its symmetry axis generates a rotating homogeneous field on a stationary sample placed near the cylinder axis; (e) is a sketch of magnets in a linear Halbach arrangement featuring a spatially rotating homogeneous magnetic field and (f) is a simulation of magnetic flux density above the arrangement with an average of 500 mT; oscillating a sample back and forth on top of the magnet arrangement generates an effective rotating magnetic field; rotating the magnets while keeping the sample stationary (g) results in a temporally and spatially rotating magnetic field in the plane of the sample (h)

Method for Making a Slurry with Non-Spherical Electrically Conducting Microparticles with Nanoparticles Deposited on their Surface and Using Such a Slurry for the Making of an Electrode Using a Halbach Cylinder:

Making of the Slurry:

5 g graphite particles (d90=32 μm, aspect ratio >6) were dispersed in 40 ml deionized $H_2O$. 200 μl cationic ferrofluid (EMG605, FerroTec GmbH, Germany) were added to the suspension and stirred for 30 min. Ultrasonic agitation was applied for 10 min. The suspension was washed 3 times with the following procedure: a. Suspension was placed in a centrifuge at 9000 rpm for 5 min; b. Supernatant was decanted, 40 ml deionized $H_2O$ added; c. Precipitate was dispersed by stirring; Suspension was placed in a centrifuge at 9000 rpm for 5 min, supernatant decanted. Precipitate was dried at 120° C. for 24 h.

Electrode Slurry Preparation:

2.7 g nanoparticle decorated graphite was mixed with 3 g polymeric binder suspension (10 wt % PVDF in NMP) and 2 g solvent (NMP, Sigma Aldrich, Switzerland) and dispersed with a high shear mixer for 10 minutes. Ultrasonic agitation was applied for 10 minutes. Slurry was rested on a rolling table for 1 h.

Electrode Fabrication:

Electrode slurry was coated on copper foil using a 200 μm notch bar. Coated electrodes were dried for 8 h at 80° C. at reduced pressure (<100 mbar) under the influence of a homogeneous, rotating magnetic field (B=100 mT, frequency=1 Hz) produced by a rotating Halbach cylinder.

Example 2

Method for Making a Slurry with Non-Spherical Electrically Conducting Microparticles with Nanoparticles Deposited on their Surface and Using Such a Slurry for the Making of an Electrode Using a Halbach Cylinder:

Synthesis of Concentrated, TMAH Stabilized Ferrofluid:

5.6 g iron(II) chloride tetrahydrate $FeCl_2*4\ H_2O$ was dissolved in 14 ml 2 M HCl to create a $Fe^{2+}$ precursor. 3.02 g iron(III) chloride hexahydrate $FeCl_3*6\ H_2O$ was dissolved in 11.2 ml 2 M HCl to create a $Fe^{3+}$ precursor. 1 ml of $Fe^{2+}$ precursor and 4 ml $Fe^{3+}$ precursor were mixed in a glass container. 1M $NH_4OH$ was added drop wise over 5 min while stirring. A permanent magnet was placed below the glass container and the supernatant was decanted after the magnetic nanoparticles accumulated near the magnet, 30 ml deionized $H_2O$ was added and the supernatant decanted again. The magnet was removed, 30 ml deionized $H_2O$ added and stirred. The magnet was placed below the glass container and the supernatant not completely decanted. 1 ml of 25 wt % tetramethylammonium hydroxide TMAH in $H_2O$ were added and agitated by moving the magnet for 2 min. The supernatant was decanted.

Nanoparticle Deposition:

5 g graphite particles (d90=32 μm, aspect ratio >6) were dispersed in 40 ml deionized $H_2O$. 200 μl nanoparticle suspension was added to the suspension and stirred for 30 min. Ultrasonic agitation was applied for 10 min. The suspension was washed 3 times with the following procedure: a. Suspension was placed in a centrifuge at 9000 rpm for 5 min; b. Supernatant was decanted, 40 ml deionized $H_2O$ added; c. Precipitate was dispersed by stirring. The suspension was placed in a centrifuge at 9000 rpm for 5 min, supernatant decanted. The precipitate was dried at 120° C. for 24 h.

Nanoparticle Deposition:

Electrode slurry preparation in that 2.6 g nanoparticle decorated graphite were mixed with 0.1 g carbon black (SuperC-65, TIMCAL, Switzerland), 3 g polymeric binder suspension (10 wt % PVDF in NMP) and 2.3 g solvent (NMP, Sigma Aldrich, Switzerland) and dispersed with a high shear mixer for 10 minutes. Ultrasonic agitation was applied for 10 minutes. The slurry was rested on a rolling table for 1 h.

Electrode Fabrication:

Electrode slurry was coated on copper foil using a 200 μm notch bar. The coated electrodes were dried for 8 h at 80° C. at reduced pressure (<100 mbar) under the influence of a homogeneous, rotating magnetic field (B=100 mT, frequency=1 Hz) produced by a rotating Halbach cylinder.

Example 3

Synthesis of Diluted, pH Stabilized Ferrofluid:

5.6 g iron(II) chloride tetrahydrate $FeCl_2*4\ H_2O$ was dissolved in 14 ml 2 M HCl to create a $Fe^{2+}$ precursor. 3.02 g iron(III) chloride hexahydrate $FeCl_3*6\ H_2O$ was dissolved in 11.2 ml 2 M HCl to create a $Fe^{3+}$ precursor. 1 ml of $Fe^{2+}$ precursor and 4 ml $Fe^{3+}$ precursor were mixed in a glass container. 1M NH4OH were added drop wise over 5 min while stirring. A permanent magnet was placed below the glass container and the supernatant was decanted after the magnetic nanoparticles accumulated near the magnet. The magnet was removed, 30 ml deionized $H_2O$ added and stirred. pH value was adjusted to 10 by drop wise addition of diluted NH4OH and HCl to stabilize suspension.

Nanoparticle Deposition and Electrode Fabrication:

2.7 g graphite particles (d90=32 μm, aspect ratio >6) were mixed with 2.3 ml deionized $H_2O$ and 700 μl nanoparticle suspension in a high shear mixer for 5 min. 130 mg NaCl was added, suspension is high shear mixed for 10 min. 1.3 g aqueous binder suspension (15 wt % styrene butadiene rubber in $H_2O$, LICO LHB-108P) was added and high-shear mixed for 10 min. Ultrasonic agitation was applied for 10 min. Slurry was rested on a rolling table for 1 h. Electrode slurry was coated on copper foil using a 200 μm notch bar. Coated electrodes were dried for 8 h at 80° C. at reduced pressure (<100 mbar) under the influence of a homogeneous, rotating magnetic field (B=100 mT, frequency=1 Hz) produced by a rotating Halbach cylinder.

Example 4

Nanoparticle Deposition from the Gas-Phase:

Electrochemically active particles with anisotropic shape are fed with 0.1-100 kg/h, preferably with 1-10 kg/h into a plasma downer reactor under reduced pressure in the range of 0.1-100 mbar, preferably in the range of 1-10 mbar, and dispersed with a mixture of process gas such as argon or nitrogen with flow rates of 100-5000 sccm, typically 500-3000 sccm and 1-50 vol %, typically 3-10 vol % organometallic precursors such as iron-pentacarbonyl $Fe(CO)_5$ or iron-tert-butoxide $[Fe(OtBu)_3]_2$. Optionally, additives such as oxygen or carbon dioxide are added to the feed gas. The discharge is an inductive or capacitive coupled radio-frequency (13.56 MHz) or microwave discharge at 10-1000 W, preferably 100-500 W.

Figure 3:
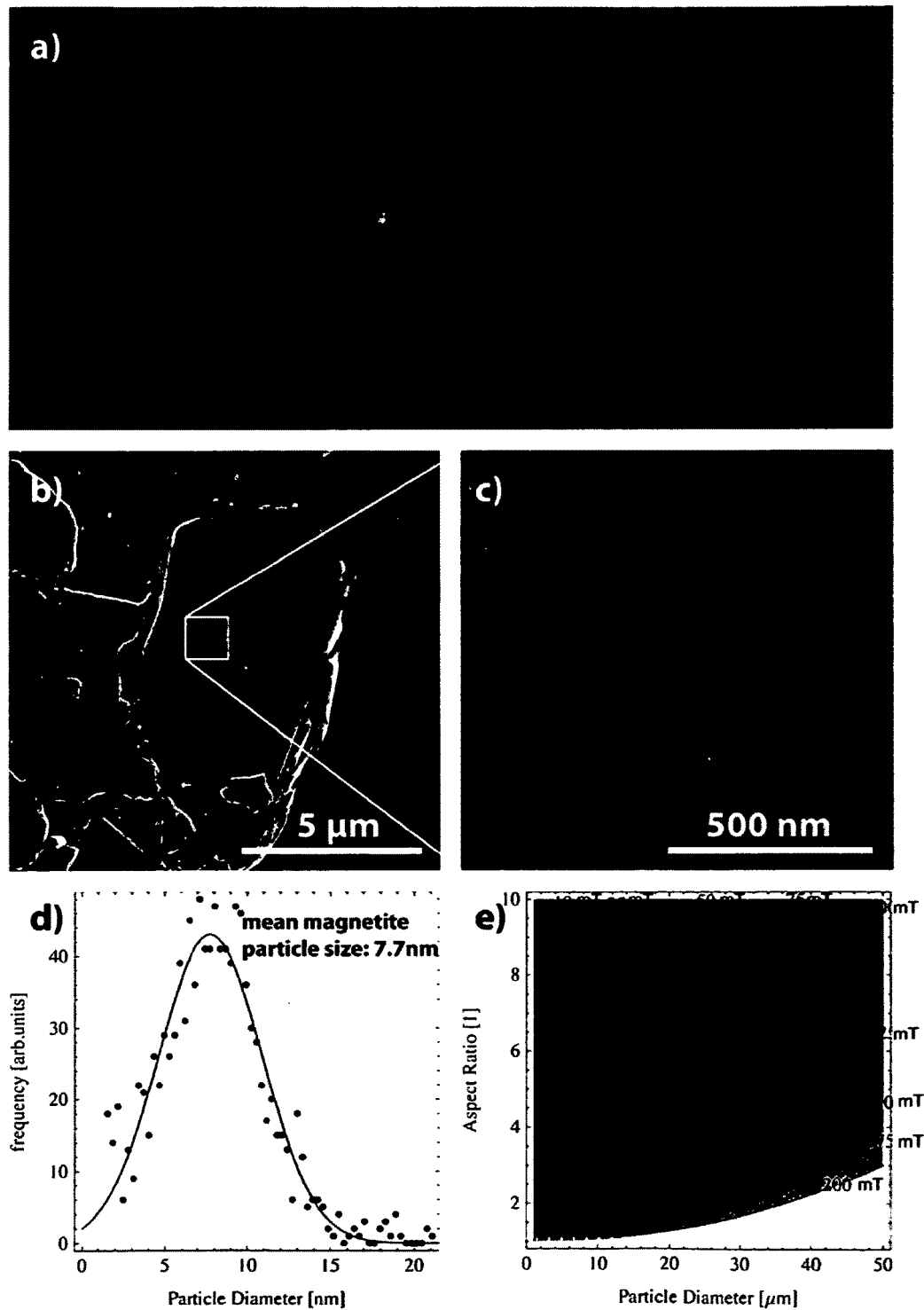
FIG. 3 shows synthesized super-paramagnetic nanoparticles showing Rosensweig instabilities under the influence of a neodymium magnet placed underneath the cup (a); electron micrographs of a surface functionalized graphite particle (b) and a close up on the deposited super-paramagnetic nanoparticles (c); extracted particle size distribution (d) from (c) allows estimation of required magnetic flux density to align particles with specific diameter and aspect ratio (e)

FIG. 3 shows the synthesized super-paramagnetic nanoparticles showing Rosensweig and an estimation of required magnetic flux density to align particles with specific diameter and aspect ratio.

Figure 4:
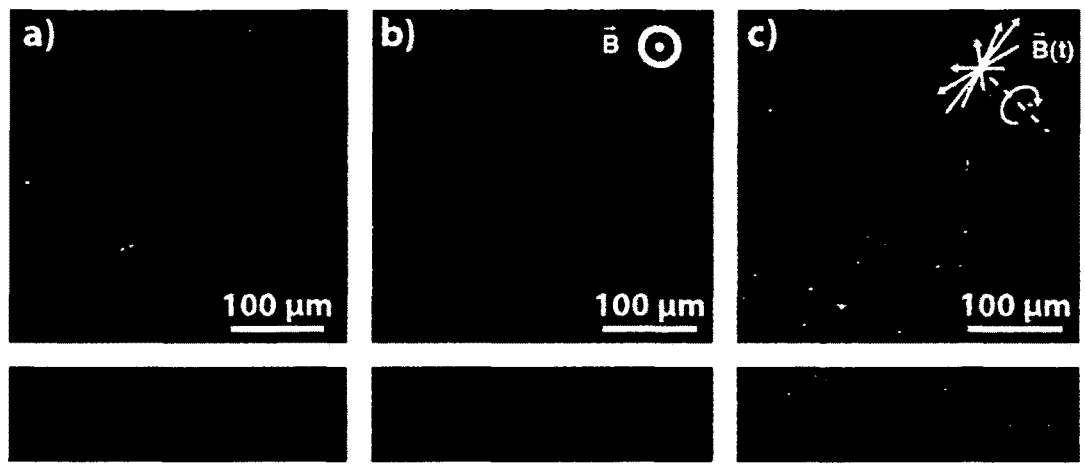
FIG. 4 shows horizontal (upper) and vertical (lower) cross-sections of graphite electrodes obtained by synchrotron x-ray tomography; traditionally fabricated electrodes (a) feature preferential horizontal particle orientation, whereas nanoparticle functionalized electrodes fabricated under the influence of a static 500 mT magnetic field (b) and a rotating 100 mT field (c) demonstrate vertical particle alignment; electrodes dried in the presence of a rotating field prove the feasibility of additionally aligning the second longest particle axis.
Figure 5:
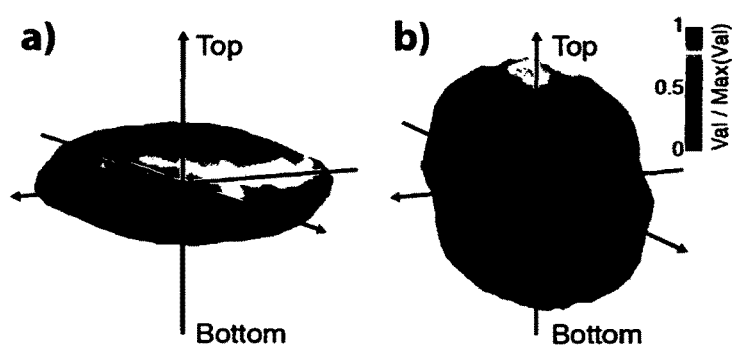
FIG. 5 shows the alignment tensor of traditional (a) and nanoparticle decorated graphite electrodes subjected to a rotating magnetic field (b), obtained by star length distribution analysis of the 3D tomographic data; the analysis shows that particles align preferentially horizontal in traditional electrodes and that they can be statistically significant aligned vertically using the discussed process.

FIG. 4 shows cross-sections of graphite electrodes obtained by synchrotron x-ray tomography comparing traditionally fabricated electrodes and nanoparticle functionalized electrodes fabricated under the influence of a static 500 mT magnetic field (b) and a rotating 100 mT field demonstrating vertical particle alignment.

Figure 6:
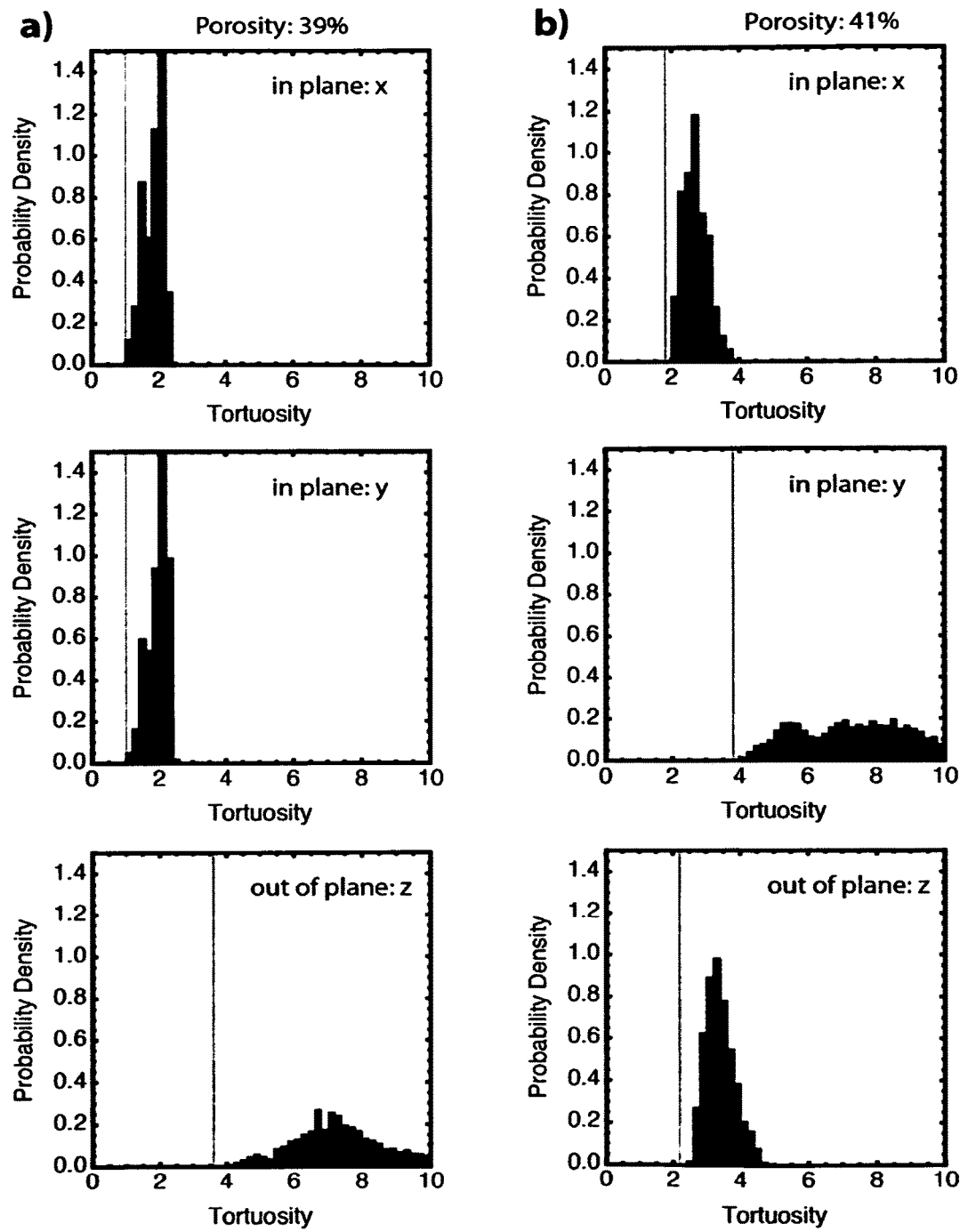
FIG. 6 shows tortuosity distributions in different directions calculated (a) from a traditional graphite electrode as depicted in FIG. 4a and (b) from a nanoparticle functionalized electrode fabricated under the influence of a rotating magnetic field as depicted in FIG. 4c; in the case of traditional electrodes (a), the largest tortuosity occurs in the out-of-plane direction, whereas in the case of nanoparticle functionalized electrodes fabricated under the influence of a rotating magnetic field (b), tortuosity is not the largest in the out-of-plane direction; in fact, out-of-plane tortuosity can be the same or even smaller than the in-plane tortuosity.

FIG. 6 shows the tortuosity calculated from tomographic data of a) traditional electrodes and b) electrodes fabricated with the process discussed in this patent application. As one can see from this figure, the feature distinguishing the new electrodes from the prior art ones is that out-of-plane tortuosity is not the highest tortuosity found in any direction and it is the same or even is smaller than the in-plane tortuosity. Typically, the porosity (defined to be the void volume) is in the range of 10-80%, preferred is a range of 20-50%. The lower limit for the tortuosity in any direction is given by the equation $(porosity/100\%)^{-0.5}$. The out-of-plane tortuosity is preferably in the range of 1-10, preferably in the range of 1-3.

Figure 7:
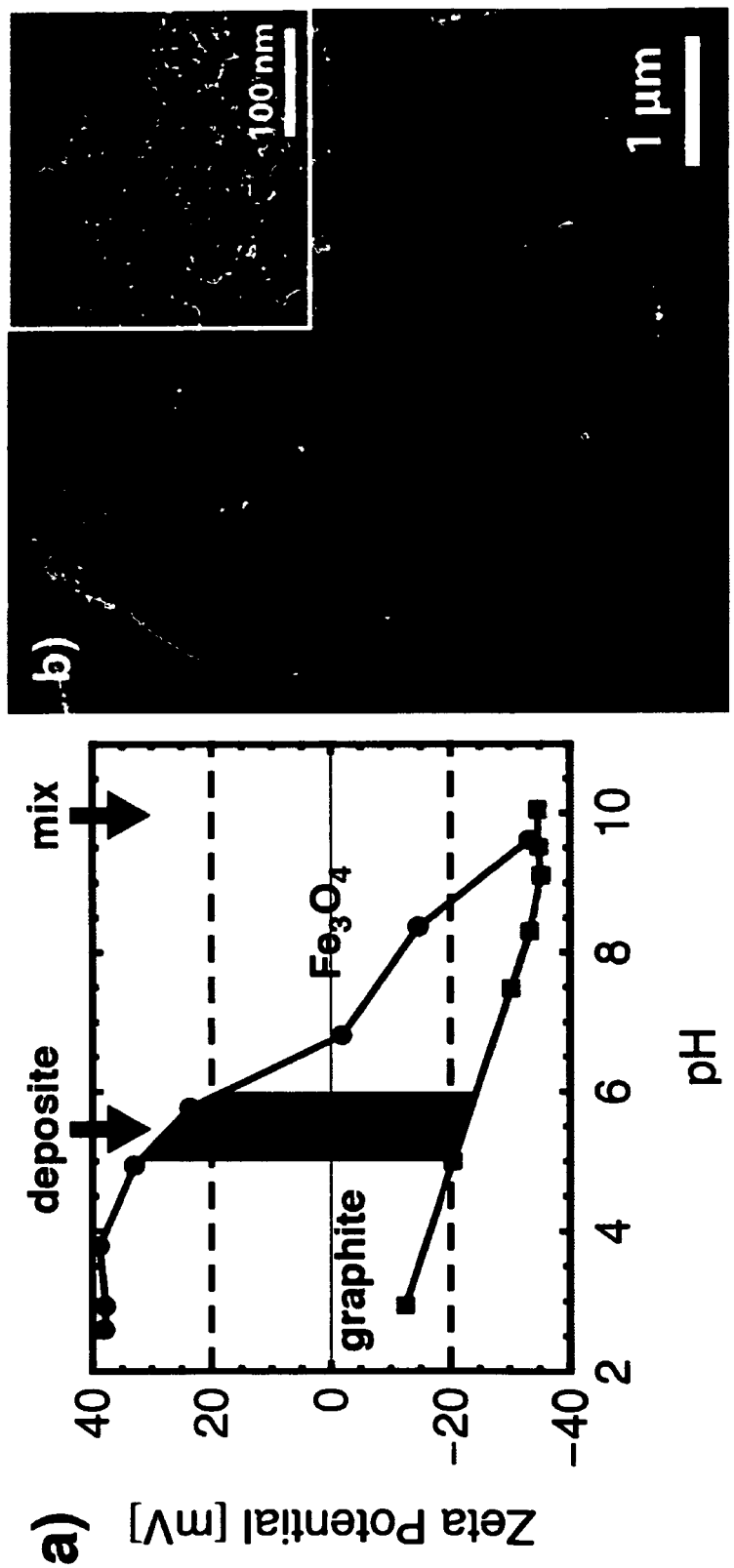
FIG. 7 shows in a) the Zeta potential of graphite and magnetite as a function of pH; and in b) a SEM image of deposited magnetite on graphite surface; inset shows TEM image of magnetite.

To avoid the complications related to electrochemical stability of surfactants, super-paramagnetic nanoparticles were synthesized that are electrostatically stabilized. In FIG. 7a, the zeta potential of magnetite is shown as a function of pH. Colloidal suspensions are typically stable if the magnitude of the zeta potential exceeds 20 mV. For magnetite, this is the case above pH 8 and below pH 6.

Synthesis:

Super-paramagnetic nanoparticles were synthesized based on the coprecipitation technique as given by Laurent et al (Chem. Rev., 2008, 108 (6), pp 2064-2110), but without the addition of permanent surfactants, as described by Kang et al. (Chem. Mater., 1996, 8 (9), pp 2209-2211).

The following synthesis steps were used:
1. Dissolve 4 mmol (0.795 g) $FeCl_2$ $4H_2O$ in 2 ml 2 M HCl in deoxygenated, deionized water;
2. Dissolve 8 mmol (2.162 g) $FeCl_3$ $6H_2O$ in 8 ml 2 M HCl in deoxygenated, deionized water;
3. Mix the two solutions in a beaker under vigorous stirring;
4. Add 100 ml 1.5 M $NH_3$ in deoxygenated, deionized water dropwise during 5 min;
5. Place strong magnet below beaker to collect super-paramagnetic nanoparticles, decant clear supernatant;
6. Remove magnet and add 100 ml deoxygenated, deionized water, stir suspension;
7. Repeat 5. and 6.;
8. Add 2 ml 1.68 M tetramethylammoniumhydroxid (TMAH) solution in water Deposition:

To deposit the super-paramagnetic nanoparticles on graphite particles, graphite was mixed with water with the super-paramagnetic nanoparticle suspension at pH 12. As shown in FIG. 7a, graphite and magnetite develop a zeta potential of about −30 mV thus repelling each other. Then the pH of the mixture was adjusted to pH 5 such that the magnetite zeta potential changes sign and the super-paramagnetic nanoparticles are attracted by the graphite surface. The steps were as follows:
1. Mix 30 g graphite (type SLP30, potato shape, particle size $d_{90}$ 32 μm, specific BET surface area 7 $m^2/g$, available from Timcal, Switzerland) and 500 ml deionized water, stir suspension;
2. Add synthesized super-paramagnetic nanoparticles suspension and mix for 5 min;
3. Continuously monitor pH and adjust to pH 5 by dropwise adding 1 M HCl;
4. Stir for 5 min;
5. Filter suspension with vacuum, wash 3× with 500 ml deionized water;
6. Dry filtrate at 120° C. under vacuum.

The result is a homogeneous coating of super-paramagnetic nanoparticles on graphite particles as depicted in FIG. 7b. The super-paramagnetic nanoparticle size is well below 50 nm, as depicted by the transmission electron micrograph inset in FIG. 7b. During the drying step at 120° C. under vacuum, all TMAH residues evaporate as ammonia vapor.

Example 5

Method for Making a Slurry with Non-Spherical Electrically Conducting Microparticles with Nanoparticles Deposited on their Surface and Using Such a Slurry for the Making of an Electrode Using a Halbach Array:

Synthesis of Concentrated, TMAH Stabilized Ferrofluid:

4 mmol (0.795 g) iron(II) chloride tetrahydrate $FeCl_2*4H_2O$ was dissolved in 2 ml 2 M HCl to create a $Fe^{2+}$ precursor. 8 mmol (2.162 g) iron(III) chloride hexahydrate $FeCl_3*6H_2O$ was dissolved in 2 ml 2 M HCl to create a $Fe^{3+}$ precursor. The $Fe^{2+}$ precursor and the $Fe^{3+}$ precursor were mixed in a glass container. 100 ml 1.5 M $NH_3$ was added drop wise over 5 min while stirring. A permanent magnet was placed below the glass container and the supernatant was decanted after the magnetic nanoparticles accumulated near the magnet, 100 ml deionized $H_2O$ was added and the supernatant decanted again. The magnet was removed, 100 ml deionized $H_2O$ added and stirred. The magnet was placed below the glass container and the supernatant was decanted after the magnetic nanoparticles accumulated near the magnet, 100 ml deionized $H_2O$ was added. 2 ml of 25 wt % tetramethylammonium hydroxide TMAH in $H_2O$ were added.

Nanoparticle Deposition:

30 g graphite particles (d90=32 μm, aspect ratio >6) were dispersed in 500 ml deionized $H_2O$. The nanoparticle suspension was added to the suspension and stirred for 30 min. Ultrasonic agitation was applied for 10 min. The pH of the suspension was adjusted by dropwise adding 1 M HCl to pH 5. The suspension was washed 3 times with the following procedure: a. Suspension was filtered with a suction filter under vacuum; b. After all the liquid was removed by filtering 500 ml deionized $H_2O$ was poured on top of the filter. After filtering off all the liquid, the filtrate was dried at 120° C. under vacuum for 24 h.

Electrode Slurry Preparation:

Electrode slurry preparation in that 7.6 g nanoparticle decorated graphite were mixed with 6.6 g polymeric binder suspension (6 wt % PVDF in NMP) and 9.6 g solvent (NMP, Sigma Aldrich, Switzerland) and dispersed with a high shear mixer for 10 minutes. Ultrasonic agitation was applied for 10 minutes. The slurry was rested on a rolling table for 1 h.

Electrode Fabrication:

Electrode slurry was coated on copper foil using a 200 μm notch bar. The coated electrodes were dried for 8 h at 80° C. at reduced pressure (<100 mbar) under the influence of a magnetic field (B=700 mT) produced by vibrating the electrodes above a Halbach array (frequency f=5 Hz).

The invention claimed is:

1. A method for the manufacturing of electrodes with at least one porous surficial layer comprising anisotropically shaped electrochemically active particles having a longest axis which is at least 1.5 times longer than a shortest axis, and having a ratio of said longest axis to a second longest axis which is smaller than 2, comprising at least the following steps:
   (a) coupling of paramagnetic nanometer-sized particles to the surface of said anisotropically shaped electrochemically active particles for the generation of composites of said paramagnetic nanometer-sized particles with said anisotropically shaped electrochemically active particles;
   (b) preparation of a slurry of said composites of said paramagnetic nanometer-sized particles with said anisotropically shaped electrochemically active particles, said slurry including a solvent mixed with a binder or a liquid binder able to release a volatile or elutable component;
   (c) application of said slurry to a planar substrate to form a film having a thickness in the range of 1-1000 micro-meter;
   (d) application of a magnetic field at least to the film and orienting said composites of said paramagnetic nanometer-sized particles with said anisotropically shaped electrochemically active particles leading to a slurry-coated substrate in which said composites of said paramagnetic nanometer-sized particles with said anisotropically shaped electrochemically active particles are arranged in that their shortest axes are, at least region-wise, essentially aligned along a common preferred axis oriented parallel to said substrate in said region; and
   (e) either during or after application of said magnetic field according to step (d), conducting at least one of:
      (i) evaporation of said solvent with solidification of the binder,
      (ii) solidification of the binder and release of said volatile component, and
      (iii) solidification of the binder and subsequent elution of the elutable component,
      under a condition that said surficial layer is formed with a solid volume fraction below 100%.

2. The method according to claim 1, wherein in step (c) a layer with a thickness of 5-500 micro-meter is applied.

3. The method according to claim 1, wherein in step (d) a rotating magnetic field is applied across the slurry-coated electrode, wherein the magnetic field vector rotates in a plane perpendicular to the substrate plane.

4. The method according to claim 1, wherein a magnetic field with a flux density in the range of 1-2000 mT is applied in step (d).

5. The method according to claim 1, wherein in step (a) the paramagnetic nanometer-sized particles are attached to the surface of the anisotropically shaped electrochemically active particles by using electrostatic adhesion in a solvent or by in-situ generation of the paramagnetic nanometer-sized particles and attachment to the anisotropically shaped electrochemically active particles in the gas phase.

6. The method according to claim 1,
   wherein the anisotropically shaped electrochemically active particles have a ratio of the longest axis to the shortest axis which is >2, or
   wherein the anisotropically shaped electrochemically active particles have a ratio of the longest axis to the second longest axis which is <1.4, or
   wherein the largest axis of the anisotropically shaped electrochemically active particles on average is in the range of 1-100 micro-meters, or
   wherein the shortest axis of the anisotropically shaped electrochemically active particles on average is in the range of 0.1-50 micro-meters, or
   wherein the anisotropically shaped electrochemically active particles are selected from the group consisting of: intercalation compounds such as graphite, transition metal oxides, phosphates, conversion (displacement) reaction materials, Lithium alloys, or combinations thereof.

7. The method according to claim 1,
   wherein said slurry further comprises additives, including processing aids, conductivity agents, dispersion agents, and combinations thereof, or
   wherein the binder used is a polymeric binder, including the ones selected from the group consisting of: styrene butadiene rubber; nitrile butadiene rubber; methyl (meth) acrylate butadiene rubber; chloroprene rubber; carboxy modified styrene butadiene rubber; modified polyorganosiloxane polymer; polyvinylidene Fluoride (PVDF) as well as derivatives and combinations thereof and wherein the solvent is at least one of an organic solvent or water, wherein the organic solvent includes those selected from the group consisting of: N methyl pyrrolidone (NMP), ethanol, acetone, water or derivatives or mixtures thereof.

8. The method according to claim 1, wherein said planar substrate is electrically conducting.

9. The method according to claim 1, wherein application of the slurry to the planar substrate in step (c) takes place by means of pasting, doctor-blading, web-coating, rolling, screen printing, solution casting, or spray deposition or a combination thereof.

10. The method according to claim 1, wherein subsequent to step (e) the film is subjected to a heat annealing treatment, or wherein subsequent to step (e) the paramagnetic particles are removed from the layer.

11. The method according to claim 1, wherein the paramagnetic nanometer-sized particles are selected to be superparamagnetic nanometer-sized particles.

12. An electrode with at least one porous surficial layer obtained or obtainable by using a method according to claim 1 or electric or electronic device, an energy storage or delivery device, an analytical device, a chemical synthesis device, or combinations thereof, comprising at least one such electrode.

13. The method according to claim 1, wherein in step (c) a layer with a thickness of 10-50 micro-meter is applied.

14. The method according to claim 1,
   wherein in step (d) a homogeneous, rotating magnetic field is applied across the slurry-coated electrode,
   wherein the magnetic field vector rotates in a plane perpendicular to a substrate plane of said planar substrate,
   wherein the magnetic flux density (B) of the rotating magnetic field is adjusted such that the minimum of the total energy (UM+UG) given by the sum of the magnetic (UM) and gravitational (UG) energies occurs at out-of-plane aligned particles for an inclination angle thereof of $\Theta=\pi/2$, and wherein the required magnetic flux is calculated based on the following formulae for the value of a particle-based variable C1 and the magnetic (UM) and gravitational (UG) energies:

$$U_G = V_p \cdot (\rho_p - \rho_f) \cdot g \cdot b \cdot \text{Sin}(\Theta)$$

$$U_M = C_1 \cdot \left(\frac{B}{\mu_0}\right)^2 \cdot \text{Sin}^2\left(\frac{\pi}{2} - \Theta\right)$$

$$C_1 = \frac{2\pi}{3} \cdot [(a+\Delta) \cdot (b+\Delta)^2 - a \cdot b^2] \cdot \frac{\mu_0 \cdot \chi_p^2}{\chi_p + 1}$$

wherein B is the magnetic flux density of the rotating magnetic field, $\Theta$ is the inclination angle of the particles, $V_p$ is the particle volume, $\rho_p$ and $\rho_f$ are the particle and fluid densities, respectively, g is the gravitational acceleration, a is one-half the particle thickness, b is one-half the particle diameter, $\Delta$ is the paramagnetic nanometer-sized particle coating thickness, $\mu_0$ is the permeability of vacuum, and $\chi_p$ is an effective coating magnetic susceptibility.

15. The method according to claim 1, wherein in step (d) a homogeneous, rotating magnetic field is applied across the slurry-coated electrode, wherein the magnetic field vector rotates in a plane perpendicular to the substrate plane, wherein the magnetic flux density (B) of the rotating magnetic field is adjusted such that the minimum of the total energy ($U_M+U_G$) given by the sum of the magnetic ($U_M$) and gravitational ($U_G$) energies occurs at out-of-plane aligned particles for an inclination angle thereof of $\Theta=\pi/2$, wherein for disc-shaped particles the required magnetic flux is calculated based on the following formulae for the value of a particle-based variable C1 and the magnetic ($U_M$) and gravitational ($U_G$) energies:

$$U_G = V_p \cdot (\rho_p - \rho_f) \cdot g \cdot b \cdot \text{Sin}(\Theta)$$

$$U_M = C_1 \cdot \left(\frac{B}{\mu_0}\right)^2 \cdot \text{Sin}^2\left(\frac{\pi}{2} - \Theta\right)$$

$$C_1 = \frac{2\pi}{3} \cdot [(a+\Delta) \cdot (b+\Delta)^2 - a \cdot b^2] \cdot \frac{\mu_0 \cdot \chi_p^2}{\chi_p + 1}$$

wherein B is the magnetic flux density of the rotating magnetic field, $\Theta$ is the inclination angle of the particles, Vp is the particle volume, $\rho_2$ and $\rho_f$ are the particle and fluid densities, respectively, g is the gravitational acceleration, a is one-half the particle thickness, b is one-half the particle diameter, $\Delta$ is the paramagnetic nanometer-sized particle coating thickness, $\mu_0$ is the permeability of vacuum, and $\chi_p$ is an effective coating magnetic susceptibility.

16. The method according to claim 1, wherein a magnetic field with a flux density in the range of 100-500 mT is applied, and in case of a rotating magnetic field the rotation frequency is in the range of 1-10 Hz.

17. The method according to claim 1,
wherein the anisotropically shaped electrochemically active particles have a ratio of the longest axis to the shortest axis which is larger than 5
wherein the anisotropically shaped electrochemically active particles have a ratio of the longest axis to the second longest axis which is smaller than 1.25, or wherein the largest axis of the anisotropically shaped electrochemically active particles on average is in the range of 1-40 micro-meters, or
wherein the shortest axis of the anisotropically shaped electrochemically active particles on average is in the range of 1-10 micro-meters.

18. The method according to claim 1, wherein said slurry further comprises additives, including processing aids, conductivity agents, dispersion agents, and combinations thereof or wherein the binder used is a polymeric binder, selected from the group consisting of: styrene butadiene rubber; nitrile butadiene rubber; methyl(meth)acrylate butadiene rubber; chloroprene rubber; carboxy modified styrene butadiene rubber; modified polyorganosiloxane polymer; polyvinylidene Fluoride (PVDF) as well as derivatives and combinations thereof and wherein the solvent is at least one of an organic solvent or water, wherein the organic solvent is selected from the group consisting of: N methyl pyrrolidone (NMP), ethanol, acetone, water or derivatives or mixtures thereof.

19. The method according to claim 1, wherein said planar substrate is electrically conducting, in the form of a foil, grid, woven or non-woven based on carbon, electrically conductive polymer, copper, aluminum, titanium, nickel, silver, gold, stainless steel, or alloys thereof.

20. The method according to claim 1, wherein paramagnetic nanometer-sized particles are selected from the group of coated or uncoated, surfactant stabilised or surfactant unstabilised, electrostatically stabilised or electrostatically unstabilised particles based on: iron oxide, such as $Fe_3O_4$, $Fe_2O_3$, cobalt, nickel, and derived alloy based particles.

21. The method according to claim 1, wherein the paramagnetic nanometer-sized particles have a size range of 1-50 nm in diameter.

22. An electrode with at least one porous surficial layer obtained or obtainable by using a method according to claim 1.

23. A device comprising at least one electrode with at least one porous surficial layer obtained or obtainable by using a method according to claim 1.

24. A battery comprising at least one electrode made using a method according to claim 1,
wherein the porous surficial layer comprises anisotropically shaped electrochemically active particles having a longest axis which is at least 1.5 times longer than the shortest axis, and having a ratio of the longest axis to a second longest axis which is smaller than 1.5,
wherein the anisotropically shaped electrochemically active particles are embedded and held together by a binder and are arranged in said layer in that their shortest axes are, at least region-wise, essentially aligned along a common preferred axis oriented parallel to said planar substrate in said region, and
wherein said surficial layer has a thickness in the range of 20-50 micro-meter and has a solid volume fraction in the range of 50-80%.

25. The method according to claim 2, wherein in step (d) a rotating magnetic field is applied across the slurry-coated electrode, wherein the magnetic field vector rotates in a plane perpendicular to the planar substrate plane.

26. The method according to claim 2,
wherein in step (d) a homogeneous, rotating magnetic field is applied across the slurry-coated electrode,
wherein the magnetic field vector rotates in a plane perpendicular to a substrate plane of said planar substrate, wherein the magnetic flux density (B) of the rotating magnetic field is adjusted such that the minimum of the total energy ($U_M+U_G$) given by the sum of the magnetic ($U_M$) and gravitational ($U_G$) energies occurs at out-of-plane aligned particles for an inclination angle thereof of $\Theta=\pi/2$, and wherein the required magnetic flux is calculated based on the following formulae for the value of a particle-based variable C1 and the magnetic ($U_M$) and gravitational ($U_G$) energies:

$$U_G = V_p \cdot (\rho_p - \rho_f) \cdot g \cdot b \cdot \sin(\Theta)$$

$$U_M = C_1 \cdot \left(\frac{B}{\mu_0}\right)^2 \cdot \sin^2\left(\frac{\pi}{2} - \Theta\right)$$

$$C_1 = \frac{2\pi}{3} \cdot [(a+\Delta) \cdot (b+\Delta)^2 - a \cdot b^2] \cdot \frac{\mu_0 \cdot \chi_p^2}{\chi_p + 1}$$

wherein B is the magnetic flux density of the rotating magnetic field, $\Theta$ is the inclination angle of the particles, $V_p$ is the particle volume, $\rho_n$ and $\rho_f$ are the particle and fluid densities, respectively, g is the gravitational acceleration, a is one-half the particle thickness, b is one-half the particle diameter, A is the paramagnetic nanometer-sized particle coating thickness, $\mu_0$ is the permeability of vacuum, and $\chi_p$ is an effective coating magnetic susceptibility.

27. The method according to claim 2, wherein in step (d) a homogeneous, rotating magnetic field is applied across the slurry-coated electrode, wherein the magnetic field vector rotates in a plane perpendicular to a substrate plane of said planar substrate, wherein the magnetic flux density (B) of the rotating magnetic field is adjusted such that the minimum of the total energy ($U_M+U_G$) given by the sum of the magnetic ($U_M$) and gravitational ($U_G$) energies occurs at out-of-plane aligned particles for an inclination angle thereof of $\Theta=\pi/2$, and wherein for disc-shaped particles the required magnetic flux is calculated based on the following formulae for the value of a particle-based variable C1 and the magnetic ($U_M$) and gravitational ($U_G$) energies:

$$U_G = V_p \cdot (\rho_p - \rho_f) \cdot g \cdot b \cdot \sin(\Theta)$$

$$U_M = C_1 \cdot \left(\frac{B}{\mu_0}\right)^2 \cdot \sin^2\left(\frac{\pi}{2} - \Theta\right)$$

$$C_1 = \frac{2\pi}{3} \cdot [(a+\Delta) \cdot (b+\Delta)^2 - a \cdot b^2] \cdot \frac{\mu_0 \cdot \chi_p^2}{\chi_p + 1}$$

wherein B is the magnetic flux density of the rotating magnetic field, $\Theta$ is the inclination angle of the particles, $V_p$ is the particle volume, $\rho_p$ and $\rho_f$ are the particle and fluid densities, respectively, g is the gravitational acceleration, a is one-half the particle thickness, b is one-half the particle diameter, A is the paramagnetic nanometer-sized particle coating thickness, $\mu_0$ is the permeability of vacuum, and $\chi_p$ is an effective coating magnetic susceptibility.

28. The method according to claim 1, wherein a rotating magnetic field with a rotation frequency in the range of 0.1-1000 Hz is applied in step (d).

29. The method according to claim 1, wherein the paramagnetic nanometer-sized particles are selected to be superparamagnetic nanometer-sized particles, selected from the group of coated or uncoated, surfactant stabilised or surfactant unstabilised, electrostatically stabilised or electrostatically unstabilised particles based on: iron oxide, such as $Fe_3O_4$, $Fe_2O_3$, cobalt, nickel, and derived alloy based particles.

* * * * *